(12) United States Patent
Riedl

(10) Patent No.: US 10,682,991 B2
(45) Date of Patent: Jun. 16, 2020

(54) HEIGHT-ADJUSTABLE SUPPORT FOR A VEHICLE

(71) Applicant: SAF-HOLLAND GmbH, Bessenbach (DE)

(72) Inventor: Reinhold Riedl, Berlin (DE)

(73) Assignee: SAF-HOLLAND GmbH, Bessenbach (DE)

( * ) Notice: Subject to any disclaimer, the term of this patent is extended or adjusted under 35 U.S.C. 154(b) by 419 days.

(21) Appl. No.: 15/035,676

(22) PCT Filed: Jan. 14, 2015

(86) PCT No.: PCT/EP2015/050530
§ 371 (c)(1),
(2) Date: May 10, 2016

(87) PCT Pub. No.: WO2015/107055
PCT Pub. Date: Jul. 23, 2015

(65) Prior Publication Data
US 2016/0264107 A1 Sep. 15, 2016

(30) Foreign Application Priority Data

Jan. 14, 2014 (DE) .......................... 10 2014 200 480

(51) Int. Cl.
*B60S 9/08* (2006.01)
*B66F 3/44* (2006.01)

(52) U.S. Cl.
CPC .. *B60S 9/08* (2013.01); *B66F 3/44* (2013.01)

(58) Field of Classification Search
CPC ...... B60S 9/08; B60S 9/04; B60S 9/12; B66F 3/44; B66F 3/18; B66F 3/16
(Continued)

(56) References Cited

U.S. PATENT DOCUMENTS

| 3,182,956 A | 5/1965 | Dalton |
| 4,402,526 A * | 9/1983 | Huetsch ................. B60S 9/08 280/766.1 |

(Continued)

FOREIGN PATENT DOCUMENTS

| DE | 19616704 | 10/1997 |
| DE | 10241905 | 3/2004 |

(Continued)

OTHER PUBLICATIONS

European Patent Office, International Search Report, dated Apr. 7, 2015.

*Primary Examiner* — Orlando E Aviles
*Assistant Examiner* — Seahee Yoon
(74) *Attorney, Agent, or Firm* — Price Heneveld LLP

(57) ABSTRACT

A height-adjustable support for a vehicle having an outer support pipe, an inner support pipe displaceably supported in the outer support pipe and deployable out of and retractable into the outer support pipe by a drive spindle, a gear unit arranged in the outer support pipe and a drive unit for driving the gear unit for moving the inner support pipe relative to the outer support pipe, wherein the drive unit has a motor arranged outside the cross section of the outer support pipe and a transmission unit, wherein a rotation axis defined by a motor shaft extends outside the outer support pipe and the transmission unit is configured to transmit a torque from the motor shaft to the gear unit, and wherein the transmission unit has a housing and a drive pinion protruding out of the housing and engaging the gear unit.

21 Claims, 2 Drawing Sheets

(58) Field of Classification Search
USPC .............................. 254/419, 425; 280/766.1
See application file for complete search history.

(56) References Cited

U.S. PATENT DOCUMENTS

| | | | | |
|---|---|---|---|---|
| 4,635,904 A * | 1/1987 | Whittingham | ............ | B60S 9/08 192/56.62 |
| 7,163,207 B2 * | 1/2007 | Baird | ................. | B60P 1/56 254/419 |
| 8,919,738 B2 * | 12/2014 | Daniel | ................. | B60S 9/12 254/418 |
| 2004/0080125 A1 * | 4/2004 | Bird | ................. | B60S 9/08 280/6.153 |
| 2004/0104381 A1 * | 6/2004 | Sharp | ................. | B60S 9/12 254/423 |
| 2006/0108748 A1 * | 5/2006 | Santos | ................. | B60S 9/12 280/5.3 |
| 2006/0170189 A1 | 8/2006 | Alguera et al. | | |
| 2007/0182148 A1 * | 8/2007 | Perkins | ................. | B60S 9/08 280/766.1 |
| 2007/0210289 A1 * | 9/2007 | Drake | ................. | B66F 3/16 254/103 |
| 2008/0146397 A1 * | 6/2008 | Drake | ................. | B60S 9/08 475/206 |
| 2009/0008917 A1 * | 1/2009 | Daniel | ................. | B60S 9/06 280/766.1 |
| 2014/0008905 A1 | 1/2014 | Rudy et al. | | |
| 2014/0077140 A1 * | 3/2014 | Baird | ................. | B60S 9/08 254/419 |

FOREIGN PATENT DOCUMENTS

| | | |
|---|---|---|
| DE | 202009009952 | 12/2009 |
| DE | 202013002815 | 6/2013 |
| EP | 2163444 | 3/2010 |
| WO | 9954178 | 10/1999 |
| WO | 0051859 | 9/2000 |

* cited by examiner

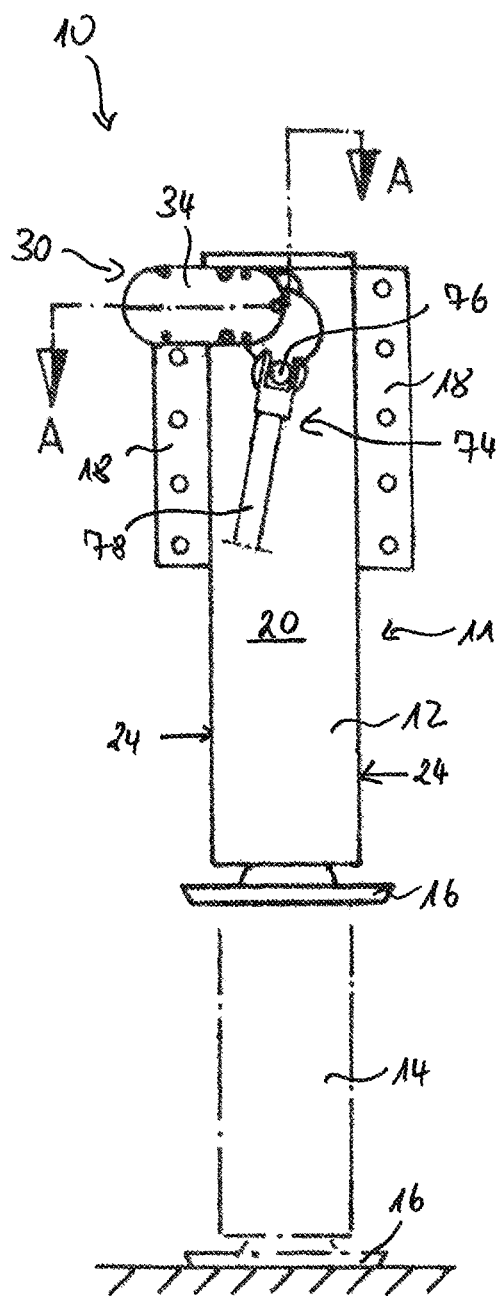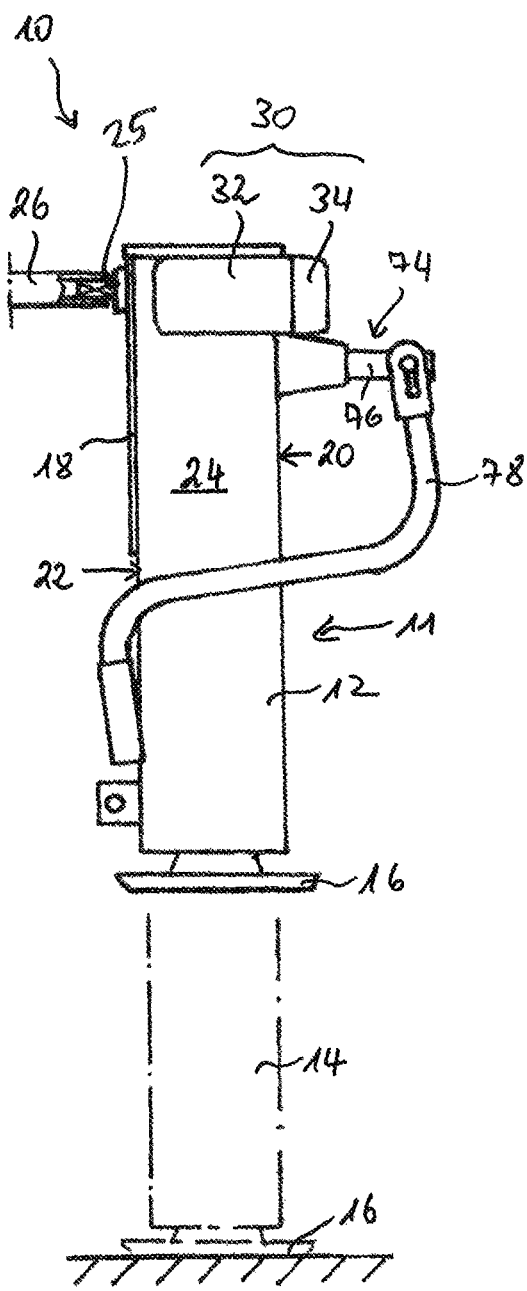

HEIGHT-ADJUSTABLE SUPPORT FOR A VEHICLE

BACKGROUND OF THE INVENTION

The invention relates to a height-adjustable support for a vehicle, in particular a semi-trailer. In the front region of a semi-trailer, there are generally fitted in pairs supports which can be adjusted in terms of height in order to support the semi-trailer when it is decoupled from the traction machine thereof. Known supports can be deployed in a so-called rapid operation into their support position and retracted into the transport position. This is generally carried out by means of a crank handle which is fitted to the support and which drives by means of a gear mechanism a spindle which extends inside the support. It is further often necessary during a mounting operation to raise or lower the semi-trailer under load, for example, as a result of unevenness of the ground or mutually different heights of different traction machines. In this case, the drive mechanisms of known supports have a load gear which has a higher reduction ratio than the high-speed gear. The raising or lowering operation under load is also generally carried out manually by means of a crank handle which is arranged on the support.

Height-adjustable supports of the known type are described, for example, in EP 2 163 444 A1 or DE 20 2009 009 952 U1.

In order to reduce the operational complexity when lifting or lowering the semi-trailer, it is additionally known to provide a motorized drive unit for deployment and retraction of the support. An arrangement of a motor on support winches mounted in pairs is described in DE 102 41 905 A1. In this instance, a motor engages with the drive shaft thereof on a connection shaft between two support winches and is supported on a component which is fixed relative to the motor. In addition, a crank handle is provided in order to be able to manually retract and deploy the support winches in the event of a failure of the motor. The connection shaft which is arranged and driven between the two support winches is already located, starting from the crank drive at the gear mechanism with a large step-down translation, in terms of force path in a high load moment range. In the further force path to the jack screw drive of each support only a small reduction is carried out in each case by means of a bevel gear stage. The motor which is arranged on the connection shaft between the support winches therefore has to be configured for a high torque, which is indicated in the document mentioned to be from 5 to 15 Nm. Furthermore, the assembly of the motor below the semi-trailer may also be difficult.

An object of the invention is to provide a height-adjustable support for a vehicle, which is simple to retract and deploy and which is constructed in the most robust manner possible.

SUMMARY OF THE INVENTION

According to the invention, the height-adjustable support comprises an outer support pipe which can be mounted on the vehicle in a fixed manner, an inner support pipe which is displaceably supported in the outer support pipe and which can be deployed out of the outer support pipe and retracted into the outer support pipe by means of a drive spindle, advantageously a base which is for placing on the ground and which is fitted to a lower end of the inner support pipe, a gear unit which is arranged in the outer support pipe and a drive unit for driving the gear unit for moving the inner support pipe relative to the outer support pipe. The drive unit has a motor which is arranged outside the cross section of the outer support pipe and a transmission unit, wherein a rotation axis which is defined by the motor shaft of the motor extends outside the outer support pipe and the transmission unit is configured to transmit a torque from the motor shaft to the gear unit which is arranged in the outer support pipe. A basic notion of the invention may involve providing outside the cross section of a support pipe which is formed by the outer support pipe and the inner support pipe a transmission unit or another gear mechanism which can also be referred to as an outer gear mechanism or an additional gear mechanism. According to the invention, this outer gear mechanism is arranged in the force path between the output of the motor, that is to say, the motor shaft or the motor journal thereof and the gear unit (internal gear) which is arranged in the outer support pipe. The gear unit or the internal gear is configured to move the inner support pipe relative to the outer support pipe, that is to say, to telescopically move the support pipe. In order to move the inner support pipe relative to the outer support pipe, it is possible to provide, for example, a threaded spindle.

The additional outer gear advantageously enables an arrangement of the motor laterally beside the outer support pipe, where, on the one hand, it is readily accessible and, on the other hand, it preferably does not protrude in an assembled state of the support beyond the outer dimensions of the vehicle. In the assembled state of the support on the vehicle, the motor is located in this instance in particular when viewed in the travel direction in front of or behind the outer support pipe. The motor may in particular be positioned at a lateral side of the support pipe in such a manner that the motor shaft extends laterally along the support pipe, preferably substantially parallel outside one of the lateral faces of the support pipe, in particular of the outer support pipe. The transmission unit is preferably placed at a frontal or front side of the outer support pipe and extends from the front side into a side (lateral) region so that it protrudes laterally, that is to say, in lateral extension of the front side, beyond the outer support pipe. In this protruding region, it is possible to flange-fit the motor which in this manner can be arranged in a lateral position relative to the outer support pipe. A gear input and a gear output of the transmission unit (outer gear) are preferably located at one and the same side of the transmission unit.

In a preferred embodiment, there is provided a connection region for a connection shaft which extends from the gear unit (internal gear) which is arranged in the outer support pipe in the direction of an additional height-adjustable support. The transmission unit is then preferably arranged at an opposing side of the outer support pipe, that is to say, a side which is opposite the connection region for the connection shaft and/or the additional height-adjustable support. The outer support pipe preferably comprises, in particular at the frontal or front side, a gear input opening which is arranged at a side of the outer support pipe opposite the connection shaft. The front side of the outer support pipe or the entire support is directed in the mounted state preferably to the side of the vehicle, that is to say, to the left or right side, and is therefore readily accessible. The transmission unit which is arranged in the force path between the motor and gear unit is preferably arranged in a separate housing which is assembled at the front side of the outer support pipe, for example, screwed. The motor in turn is preferably secured to the housing of the transmission unit.

The gear unit which is arranged in the outer support pipe preferably comprises a spur gear stage which steps down and a bevel gear stage which is arranged downstream of the spur gear stage in the force path. In the at least one spur gear stage, the speed is reduced and the torque is increased. The spur gear stage is provided to transmit or redirect a preferably horizontal rotation movement in the spur gear stage to the preferably vertically extending drive spindle. In this instance, there is preferably no or at most still a small speed reduction (smaller than in the spur gear stage). The connection shaft to the additional support of the generally provided support pair is arranged in the force path preferably between the spur gear stage and the bevel gear stage, that is to say, it rotates at a reduced speed. The transmission unit is in contrast preferably arranged in the force path upstream of the spur gear stage in order to enable the use of a rapidly rotating motor. Preferably, the transmission unit connects in terms of force a motor output shaft of the motor to a gear input shaft of the gear unit parallel therewith, in particular the spur gear stage. A lateral arrangement of the motor relative to the outer support pipe is intended to be understood in conjunction with the spur gear stage of the gear unit in particular to be an arrangement at a lateral side beside the outer support pipe which extends along at least one rotation axis of the spur gear stage. This side is directed in the mounted state of the support preferably to the front or the rear of the vehicle and is located transversely relative to the front and/or rear side of the outer support pipe or support pipe.

A simple assembly of the drive unit on the outer support pipe can be achieved by the transmission unit having a housing and a drive pinion which protrudes or projects out of the housing and which engages in the gear unit which is arranged in the outer support pipe. To this end, the outer support pipe has a corresponding gear input opening into which the drive pinion can be introduced in order to be brought into engagement with a first toothed wheel of the gear, in particular the spur gear stage. The housing may be screwed, for example, to the front or frontal side of the outer support pipe, wherein this side may be intended in particular to be understood to be the side of the outer support pipe which extends transversely with respect to at least one rotation axis of the spur gear stage and in the installed state is generally directed to the left or right side of the vehicle.

A particularly precise and simple assembly can be achieved in that the drive pinion is supported in a centering bush which protrudes from the housing of the transmission unit and which is received in an input opening of the outer support pipe. The drive pinion protrudes in this instance beyond the centering bush in order to be in engagement with a gear input wheel of the gear which is arranged in the outer support pipe. The input opening or hole is preferably constructed as a fitting bore in order to receive the centering bush in a precisely fitting manner. It is preferably located in a wall of the front side of the outer support pipe. The centering bush is supported in the housing of the transmission unit and is preferably retained at that location in a positive-locking manner. Preferably, the centering bush is constructed as a collar type bearing bush and fixed with the protruding collar thereof in the housing of the transmission unit.

The transmission unit has between the motor shaft and the drive pinion preferably at least two gear wheels, in particular spur gear wheels, friction wheels or traction means wheels. For a construction which is as flat as possible, all the gear wheels of the transmission unit are preferably arranged in a common plane. Alternatively, the gear wheels may also be arranged in order to provide an additional gear reduction in a plurality of, preferably two, planes.

In order to prevent damage to the motor, for example, in the event of a delayed stop or overrun when switching off at the lifting end of the support, at least one of the gear wheels, in particular a first and/or a last gear wheel of the transmission unit, is preferably mounted on a sliding hub to which it is connected in a frictionally engaging manner.

In order to achieve the lowest possible structural height of the transmission unit, it is further advantageous for the transmission unit to have between the motor shaft and the drive pinion a drive wheel, an output wheel and at least one intermediate wheel which is arranged therebetween. In this manner, the individual wheels, which may in particular be toothed wheels or friction wheels, can be sized to be comparatively small. The spacing between the drive wheel and the output wheel is bridged by means of one or more intermediate wheels. Alternatively, a traction means gear mechanism is also possible. Preferably, all the gear wheels which are arranged in the force path between the motor shaft and the drive pinion are arranged in a common plane. Preferably, the drive wheel and/or the output wheel is/are arranged on a sliding hub.

For a particularly simple assembly, it is preferable for the drive unit to form a unit which can be preassembled and which can be mounted on the outer support pipe and advantageously disassembled, in particular screwed thereto. To this end, the motor is preferably first mounted on the transmission unit and subsequently the subassembly formed by the motor and transmission unit (drive unit) is fitted to the outer support pipe. The drive unit is preferably mounted on the front side of the outer support pipe, that is to say, the side which extends transversely relative to the rotation axes of the gear unit (internal gear), in particular the spur gear stage thereof.

At the front side of the support pipe, in particular the outer support pipe, there is further preferably provided an actuation device for manual retraction or deployment of the inner support pipe. The actuation device preferably comprises a crank drive having a crank handle. The crank drive engages in terms of force, in the same manner as the drive pinion, preferably at the input of the spur wheel gear stage. The manual actuation device is preferably located at the front side of the outer support pipe beside and/or above/below the transmission unit. Preferably, the manual actuation device is configured to prevent co-rotation of the crank handle during motor operation. This may in particular be achieved by the crank handle being able to be adjusted into a free-running position.

The drive unit is preferably flange-mounted at the frontal or front side of the outer support pipe, in particular in an upper region substantially at the height of the gear mechanism, and is suspended in this manner on the outer support pipe. The drive pinion is moved into engagement with the spur gear stage and the motor is arranged at the side of the support. The transmission unit may also be referred to as a reduction gear and is preferably constructed as a flat reduction gear. It has only a small depth, preferably a maximum of 10 centimeters. The transmission unit and the entire drive unit thereby only slightly increase the entire depth of the support. The motor as a result of its position (laterally) beside the support does not increase the structural depth of the support.

The drive unit is located as a result of the configuration according to the invention in a force path region in which only a small drive torque is required. The motor is therefore preferably configured for a maximum torque of 5 Nm, preferably 3 Nm, in particular a torque of from 1 to 3 Nm.

The motor is located—when the support is viewed from the front—that is to say, in the direction of a rotation axis of the spur gear stage—spatially behind the transmission unit and laterally beside the support. It is consequently arranged in a protected region so that any risk of damage is minimized. As a result of the assembly possibility of the pre-assembled subassembly comprising the motor and transmission unit, a simplified assembly is ensured so to speak.

The invention also relates in principle to a drive unit alone for assembly on the support pipe of a support.

The invention further relates to a support device for a vehicle, in particular a semi-trailer, having two height-adjustable supports which are coupled to each other in terms of driving by means of a connection shaft in such a manner that both supports can be telescopically moved by means of a common drive unit, wherein one of the supports is a support according to the invention. The additional support is driven by means of the connection shaft so that the drive unit having the motor and transmission unit and the crank handle can be dispensed with therein. Furthermore, in the second support, it is possible to dispense with a spur gear stage and arrange only a bevel gear stage since downstream of the connection shaft at most there is still a small step-down translation.

With respect to the support device which has a support pair, it is preferable for the motor of the drive unit to be arranged laterally beside the associated support and for the free end of the motor shaft to face away from the other support.

BRIEF DESCRIPTION OF THE DRAWINGS

The invention is further described below with reference to an exemplary embodiment which is illustrated in the appended Figures, in which:

FIG. 1 is a front view of a support according to the invention;

FIG. 2 is a side view of the support shown in FIG. 1; and

Elements which are the same or which have the same action are indicated with the same reference numerals in all the Figures.

DETAILED DESCRIPTION OF THE PREFERRED EMBODIMENTS

Figure 3:
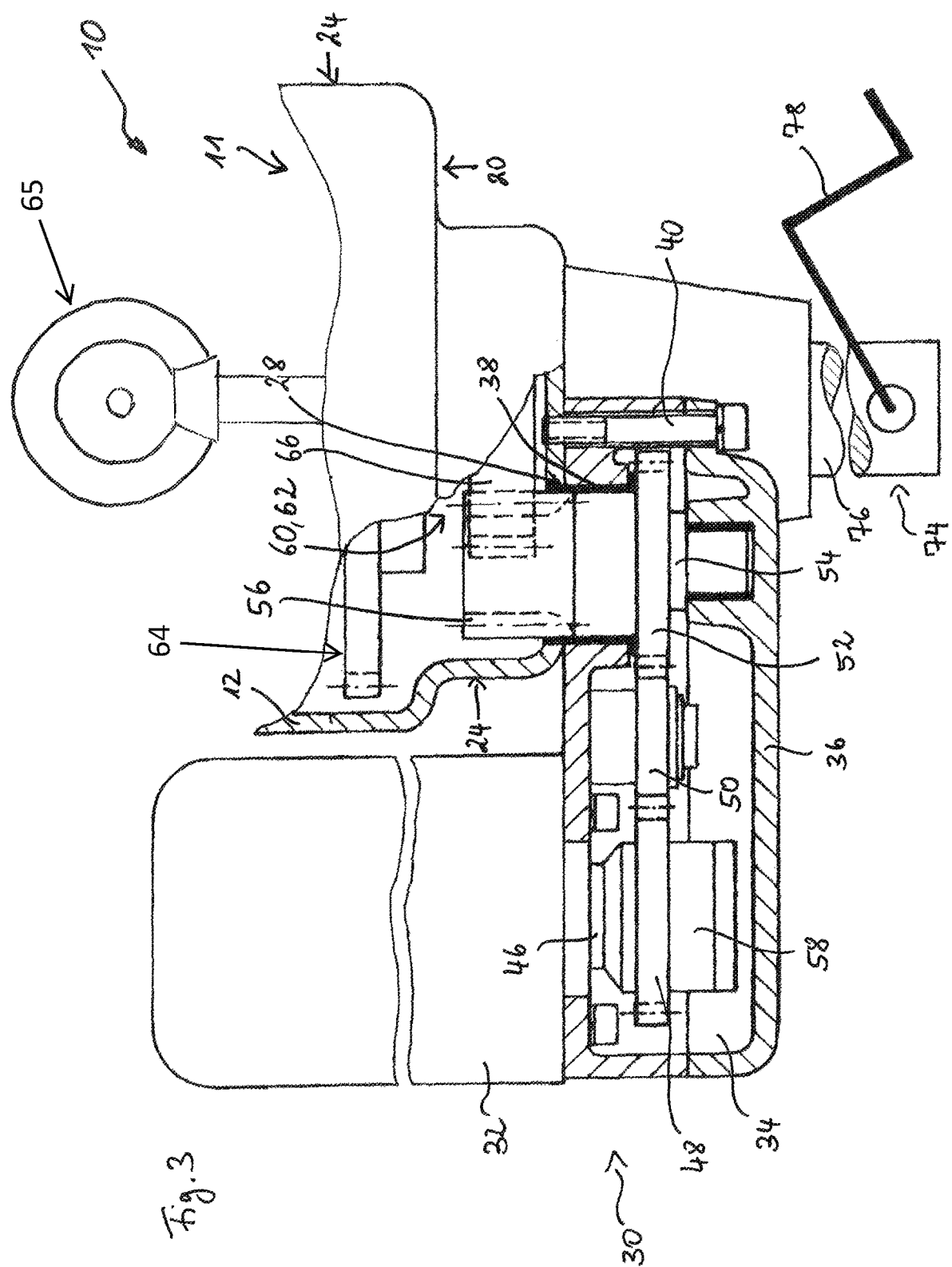
FIG. 3 is a partial longitudinal section along the line A-A in FIG. 1.

A support 10 according to the invention comprises a support pipe 11 comprising an outer support pipe 12 and an inner support pipe 14 which is arranged so as to be displaceable therein along a longitudinal axis. At a lower end of the inner support pipe 14 there is secured a base 16 for placing on the ground. The base 16 comprises a substantially vertically extending base plate. On the outer support pipe 12 a screw plate 18 is secured in order to secure the outer support pipe 12 to a frame of a vehicle to be supported in a fixed manner. The screw plate 18 is in the embodiment illustrated mounted on a rear side 22 of the support 10 and protrudes beyond the lateral sides 24 of the outer support pipe 12. On a front side 20 of the support 10, there is arranged a crank drive 74 which comprises a shaft 76 which protrudes into the outer support pipe 12 and a crank handle 78.

The shaft 76 of the crank drive 74 engages in a gear unit 60 which is arranged in the support pipe 11 and which has a torque-increasing spur gear stage 62 and a bevel gear stage 64 which is located therebehind in the force path and which is in engagement with a lifting spindle drive or a drive spindle 65. The drive spindle which is connected to the inner support pipe 14 extends perpendicularly in the support pipe 11 and serves to retract and deploy the inner support pipe 14 into or out of the outer support pipe 12. The gear unit 60 which is arranged in the support pipe 11 may be constructed in a similar manner to the gear unit described in DE 20 2009 009 952 U1 or EP 2 163 444 A1. The corresponding disclosures of these documents are incorporated herein by reference.

The spur gear stage may be constructed with one, two or multiple stages. In the force path between the spur gear stage 62 which steps down and the bevel gear stage, there is provided a connection shaft 26 which connects the support 10 according to the invention to another support in such a manner that both supports can be retracted and deployed at the same time. To this end, the connection shaft 26 is in engagement with a corresponding spur gear stage in the second support. By means of the connection shaft 26, the support 10 is connected to the adjacent support in a non-positively-locking manner. The connection shaft 26 extends between the respective rear sides 22 of the supports which are connected to each other. The supports can be adjusted together with the crank handle 78 manually between a deployed support position and a retracted transport position.

For motorized driving of the support 10, there is provided a motorized drive unit 30 which is mounted on the front side 20 of the outer support pipe 12 of the support 10 according to the invention and which comprises a motor 32 and a gear or transmission unit 34. The transmission unit 34 is secured to the outer support pipe 12 by means of securing elements 40, such as, for example, screws and itself carries the motor 32. The motor 32 is arranged in front of or beside a lateral side 24 of the outer support pipe 12, wherein the lateral side 24 is orientated transversely relative to the front side 20. The transmission unit 34 is arranged outside the cross section of the outer support pipe 12.

The motor 32, in particular an electric motor, comprises a motor shaft 46 which protrudes at the rear side into a housing 36 of the transmission unit 34 and whose rotation axis is parallel with the rotation axis of the spur gear stage 62. The housing 36 has a length, a height and a depth, wherein the length is greater than the height and the height is greater than the depth. The length of the housing 36 extends transversely, in particular at right angles with respect to the motor shaft 46 and in the installed state of the support substantially horizontally. The transmission unit 34 is constructed as a flat reduction gear having a depth of a maximum of approximately 10 centimeters. The depth extends in the direction of the motor shaft 46 and in the direction of the rotation axis (axes) of the spur gear stage 62.

On the motor shaft 46 which extends in particular parallel with the shaft 76 of the crank drive 74 there is a drive toothed wheel 48 which can be mounted, for example, by means of a sliding hub 58. The drive toothed wheel 48 is in engagement with an intermediate toothed wheel 50 which is arranged parallel therewith and which in turn drives an output toothed wheel 52 which is also arranged parallel therewith. The output toothed wheel 52 is arranged on an output shaft 54 which is orientated parallel with the motor shaft 46. The output shaft 54 further carries a drive pinion 56 which protrudes parallel with the motor shaft 46 at the rear side out of the housing 36 of the transmission unit 34 and which is in engagement with the gear unit 60 in the support pipe 11, in particular with the spur gear stage 62. The drive pinion 56 which protrudes out of the housing 36 drives a gear input toothed wheel 66 of the gear unit 60, which gear input toothed wheel is arranged in the outer support pipe 12 and is orientated parallel with the motor shaft 46 and offset relative thereto. To this end, there is provided in the outer support pipe 12 an input opening 28 through which preferably the output shaft 54 and/or the drive pinion 56 extend(s). The spur gear stage 62 transmits the rotation movement to the connection shaft 26, wherein the speed is reduced and the torque is increased. On the connection shaft 26 which is rotating slowly there is located a bevel gear which is not illustrated and which meshes with another bevel gear which is not illustrated and which is located on the drive spindle which extends perpendicularly in the support pipe 11. The drive spindle displaces the inner support pipe 14 with respect to the outer support pipe 12. Advantageously, the rotation planes of the gear wheels 48, 50 and/or 52 of the transmission unit 34 extend transversely, in particular perpendicularly, relative to the rotation axis of the spur gear stage 62.

For precise positioning of the drive unit 30 on the outer support pipe 12, a centering bush 38 is provided. This is supported in the housing 36 of the transmission unit 34 and is in engagement with the input opening 28 of the outer support pipe 12. The input opening 28 is preferably constructed as a fitting bore, between the centering bush 38 and the fitting bore a fit is preferably formed. The drive pinion 56 is rotatably supported in the centering bush 38.

A rotation of the crank handle 78 may in particular be prevented by the drive pinion 56 which is located on the output shaft 54 being able to be moved into a free-running position in which it engages in neither a load gear toothed wheel nor a high-speed gear toothed wheel of the gear unit 60. There may be provision for this free-running position to be electrically acknowledged by means of an end switch before the motor 32 can run.

On the whole, with the invention a compact and robust support is provided for supporting a vehicle. The drive unit can be assembled from a front side of the support pipe and the motor is substantially protected from damage by means of its arrangement at a rear side of the transmission unit and at the side of the support pipe. The connection according to the invention to the input of the torque-increasing gear stage enables the use of a motor which is configured for a comparatively low torque.

LIST OF REFERENCE NUMERALS

10 Support
11 Support pipe
12 Outer support pipe
14 Inner support pipe
16 Base
18 Screw plate
20 Front side
22 Rear side
24 Lateral side
25 Connection region
26 Connection shaft
28 Input opening
30 Drive unit
32 Motor
34 Transmission unit
36 Housing
38 Centering bush
40 Securing element
46 Motor shaft
48 Drive wheel
50 Intermediate wheel
52 Output wheel
54 Output shaft
56 Drive pinion
58 Sliding hub
60 Gear unit
62 Spur gear stage
66 Gear input toothed wheel
74 Crank drive
76 Shaft
78 Crank handle

The invention claimed is:

1. A height-adjustable support for a vehicle, comprising:
an outer support pipe configured to mount on the vehicle in a fixed manner;
an inner support pipe displaceably supported in the outer support pipe and configured to be deployed out of the outer support pipe and retracted into the outer support pipe by a drive spindle;
a gear unit which is arranged in the outer support pipe; and
a drive unit configured to drive the gear unit to move the inner support pipe relative to the outer support pipe;
wherein the drive unit has a motor arranged outside a cross section of the outer support pipe and a transmission unit;
wherein a rotation axis which is defined by a motor shaft of the motor extends outside the outer support pipe and the transmission unit is configured to transmit a torque from the motor shaft to the gear unit which is arranged in the outer support pipe;
wherein the transmission unit has a housing and a drive pinion which protrudes out of the housing and which engages in the gear unit which is arranged in the outer support pipe;
wherein the transmission unit has between the motor shaft and the driven pinion a drive wheel, an output wheel and at least one intermediate wheel arranged between the drive wheel and the output wheel;
wherein the motor is exclusively supported by the housing of the transmission unit and the motor shaft; and
wherein the motor is arranged, when the support is viewed from a front of the support, spatially behind the transmission unit and laterally beside the support.

2. The height-adjustable support as claimed in claim 1, wherein the motor is arranged laterally beside the outer support pipe.

3. The height-adjustable support as claimed in claim 2, wherein a connection region for a connection shaft which extends from the gear unit which is arranged in the outer support pipe in the direction of an additional height-adjustable support, and wherein the transmission unit is arranged at a side of the outer support pipe which is opposite the connection region for at least one of the connection shaft and the additional height-adjustable support.

4. The height-adjustable support as claimed in claim 3, wherein the gear unit which is arranged in the outer support pipe comprises a spur gear stage which steps down and a bevel gear stage which is arranged downstream, and wherein the transmission unit is arranged upstream of the spur gear stage.

5. The height-adjustable support as claimed in claim 4, wherein the drive pinion is supported in a centering bush which protrudes from the housing of the transmission unit and which is received in an input opening of the outer support pipe.

6. The height-adjustable support as claimed in claim 5, wherein at least one of the drive wheel, the output wheel and the at least one intermediate wheel is mounted on a sliding hub.

7. The height-adjustable support as claimed in claim 6, wherein the drive unit forms a unit which is configured to be preassembled and which is configured to be mounted on the outer support pipe.

8. The height-adjustable support as claimed in claim 7, wherein at the front side of the outer support pipe there is an actuation device for at least one of manual retraction and deployment of the inner support pipe.

9. The height-adjustable support as claimed in claim 8, wherein at least one of the drive unit is flange-mounted at the frontal or front side of the outer support pipe in an upper region substantially at the height of the gear unit, and the motor is arranged at the side of the support.

10. The height-adjustable support as claimed in claim 9, wherein the motor is secured to the housing of the transmission unit.

11. The height-adjustable support as claimed in claim 1, wherein a connection region for a connection shaft which extends from the gear unit which is arranged in the outer support pipe in the direction of an additional height-adjustable support, and wherein the transmission unit is arranged at a side of the outer support pipe which is opposite the connection region for at least one of the connection shaft and the additional height-adjustable support.

12. The height-adjustable support as claimed in claim 1, wherein the gear unit which is arranged in the outer support pipe comprises a spur gear stage which steps down and a bevel gear stage which is arranged downstream, and wherein the transmission unit is arranged upstream of the spur gear stage.

13. The height-adjustable support as claimed in claim 1, wherein the drive pinion is supported in a centering bush which protrudes from the housing of the transmission unit and which is received in an input opening of the outer support pipe.

14. The height-adjustable support as claimed in claim 1, wherein at least one of the drive wheel, the output wheel and the at least one intermediate wheel is mounted on a sliding hub.

15. The height-adjustable support as claimed in claim 1, wherein the drive unit forms a unit which is configured to be preassembled and which is configured to be mounted on the outer support pipe.

16. The height-adjustable support as claimed in claim 1, wherein at the front side of the outer support pipe there is an actuation device for at least one of manual retraction and deployment of the inner support pipe.

17. The height-adjustable support as claimed in claim 1, wherein at least one of the drive unit is flange-mounted at the frontal or front side of the outer support pipe in an upper region substantially at the height of the gear unit, and the motor is arranged at the side of the support.

18. The height-adjustable support as claimed in claim 1, wherein the motor is secured to the housing of the transmission unit.

19. A support device for a vehicle comprising:
two height-adjustable supports which are coupled to each other by a connection shaft in such a manner that both supports are configured to be telescopically moved by a common drive unit; and
wherein one of the two supports comprises the support as claimed in claim 1.

20. The height adjustable support as claimed in claim 7, wherein a crank drive having a crank handle is configured to be operably coupled to the gear unit.

21. The height adjustable support as claimed in claim 1, wherein a crank drive having a crank handle is configured to be operably coupled to the gear unit.

* * * * *